United States Patent [19]

Suyama

[11] Patent Number: 5,562,538
[45] Date of Patent: Oct. 8, 1996

[54] CONTROL APPARATUS FOR AIR CONDITIONING UNIT IN MOTOR VEHICLE

[75] Inventor: Kouichi Suyama, Wako, Japan

[73] Assignee: Honda Giken Kogyo Kabushiki Kaisha, Tokyo, Japan

[21] Appl. No.: 365,195

[22] Filed: Dec. 28, 1994

[30] Foreign Application Priority Data

Dec. 28, 1993 [JP] Japan ..................... 5-338671

[51] Int. Cl.⁶ ........................................ B60H 1/32
[52] U.S. Cl. ..................... 454/75; 165/43; 165/267
[58] Field of Search ................. 454/75; 165/12, 165/43, 42

[56] References Cited

U.S. PATENT DOCUMENTS

| | | | |
|---|---|---|---|
| 4,489,242 | 12/1984 | Worst | 307/10 R |
| 5,305,613 | 4/1994 | Hotta et al. | 454/43 |
| 5,325,912 | 7/1994 | Hotta et al. | 454/75 X |
| 5,330,385 | 7/1994 | Hotta et al. | 454/75 |

FOREIGN PATENT DOCUMENTS

3-42325  2/1991  Japan.

*Primary Examiner*—Harold Joyce
*Attorney, Agent, or Firm*—Lyon & Lyon

[57] ABSTRACT

When a battery charger supplying external power to a vehicle air conditioning unit is detected as being disconnected by a connection sensor, a central processing unit stops operating the air conditioning unit upon elapse of a predetermined time after the detected disconnection. When a start signal is inputted from an ignition switch within the predetermined time, the central processing unit switches to a normal air conditioning mode to continue operating the air conditioning unit without interruption. The operation sequence is effective to prevent the energy stored in a battery as an internal power source from being unduly wasted, and to switch smoothly to the normal air conditioning mode.

6 Claims, 8 Drawing Sheets

CONTROL APPARATUS FOR AIR CONDITIONING UNIT IN MOTOR VEHICLE

BACKGROUND OF THE INVENTION

1. Field of the Invention

The present invention relates to a control apparatus for controlling an air conditioning unit in a motor vehicle to air-condition the passenger's compartment of a motor vehicle using internal and external power sources to achieve a comfortable riding environment in the passenger's compartment before the motor vehicle starts to run.

2. Description of the Related Art

Motor vehicles are equipped with an air conditioning unit for controlling the temperature, humidity, air flow, etc., in the passenger's compartment to keep the driver and passengers comfortable.

The air conditioning unit installed in a motor vehicle which is powered by an internal combustion engine is unable to start operating unless the engine is in operation. Therefore, if the engine is not in operation, then the driver or passengers are subject to uncomfortable conditions, e.g., an undesirable temperature or humidity, when they get into the motor vehicle. Since the start of the air conditioning unit may be delayed until the engine is readied to produce normal power or it may take a considerable period of time to be able to supply a sufficient amount of warm or cool air into the passenger's compartment, it is usually difficult to obtain a comfortable riding environment in the passenger's compartment as soon as the driver or passengers get into the motor vehicle.

To solve the above problems, it has been proposed in Japanese laid-open patent publication No. 3-42325 for a control apparatus to learn an optimum temperature and other parameters for the passenger's compartment of an automobile, and automatically start the engine of the automobile based on the learned information to adjust the temperature, humidity, etc. in the passenger's compartment.

However, because the engine is automatically started without being attended by the driver, the proposed arrangement imposes safety problems, and the fuel which is required to propel the automobile is wasted before the automobile actually starts moving.

There has been proposed an air conditioning control apparatus which employs an external power source connected to a motor vehicle to actuate an air conditioning unit before the driver gets into the motor vehicle, so that a comfortable riding environment can be attained in the passenger's compartment at a desired time when the driver gets into the motor vehicle.

The external power source is disconnected from the motor vehicle by the driver when the driver gets into the motor vehicle. However, the driver may not enter the motor vehicle immediately after the driver has disconnected the external power source from the motor vehicle. Alternatively, the external power source may be accidentally dislodged rather than being removed by the driver. At any rate, when the external power source becomes no longer available, the air conditioning unit starts being actuated by an internal power source. If the air conditioning unit is continuously actuated by the internal power source to air-condition the passenger's compartment, energy of the internal power source is unduly wasted by the air conditioning unit, possibly causing trouble when the motor vehicle actually runs.

After the driver gets into the motor vehicle, the air conditioning unit should desirably be kept in an operating condition. If the air conditioning unit were automatically turned off when a preset time has elapsed after the driver gets into the motor vehicle, the driver would have to turn on the air conditioning unit again, and would find it cumbersome to use the air conditioning control apparatus.

SUMMARY OF THE INVENTION

It is therefore an object of the present invention to provide a control apparatus for controlling an air conditioning unit in a motor vehicle to achieve a comfortable riding environment in the passenger's compartment in the motor vehicle before the motor vehicle starts to run, while minimizing the consumption of energy that is stored by an internal power source and required to propel the motor vehicle.

Another object of the present invention is to provide a control apparatus for controlling an air conditioning unit in a motor vehicle to continuously keep the air conditioning unit in an operating condition when the motor vehicle gets started.

To achieve the above objects, there is provided in accordance with the present invention a control apparatus for controlling an air conditioning unit in a vehicle, comprising an internal power source mounted on the motor vehicle for supplying energy to the motor vehicle, a connector for connection to an external power source for supplying energy to the motor vehicle, connection detecting means for detecting a connection of the external power source to the connector, an air conditioning unit energizable by the energy supplied from the internal power source or the external power source for regulating a riding environment including the temperature in a passenger's compartment of the motor vehicle, setting means for setting a time to start operating the air conditioning unit, and control means for starting operation of the air conditioning unit either when the time set by the setting means to start operating the air conditioning unit is reached or when instructed to start operating the air conditioning unit, and for stopping operation of the air conditioning unit when the time which has elapsed after the connection detecting means has detected a disconnection of the external power source from the connection reaches a predetermined time.

The control apparatus may further comprise starting detecting means for detecting a starting of the motor vehicle, the control means comprising means for continuing operation of the air conditioning unit beyond the predetermined time when the starting detecting means detects a starting of the motor vehicle within the predetermined time.

With the above arrangement, at the time set by the setting means to start operating the air conditioning unit or when instructed to start operating the air conditioning unit, the control means starts operating the air conditioning unit with the energy supplied from the external power source. When the external power source is detected as being disconnected by the connection detecting means while the air conditioning unit is operating, the control means stops operating the air conditioning unit upon elapse of a predetermined time after the detected disconnection, thereby minimizing wasteful consumption of the energy from the internal power source.

The starting detecting means can detect when the motor vehicle is started after the external power source has been disconnected. Therefore, the air conditioning unit can continuously operate in a normal air conditioning mode. The driver is not required to reset the air conditioning unit, and a comfortable riding environment can be attained in the passenger's compartment.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

The principles of the present invention are particularly useful when embodied in a control apparatus for controlling an air conditioning unit in an electric vehicle. The electric vehicle carries a battery that can be charged to a required energy level by a battery charger connected as an external power supply. The invention will be described in connection with an electric vehicle but it is useful also with a vehicle driven by an internal combustion engine, particularly if the air condition system compressor is driven by an electric motor and an outside electric power source is available where the vehicle is parked as will appear from the following description.

First, the mechanical arrangement of the electric vehicle 10 will be described below.

Figure 1:
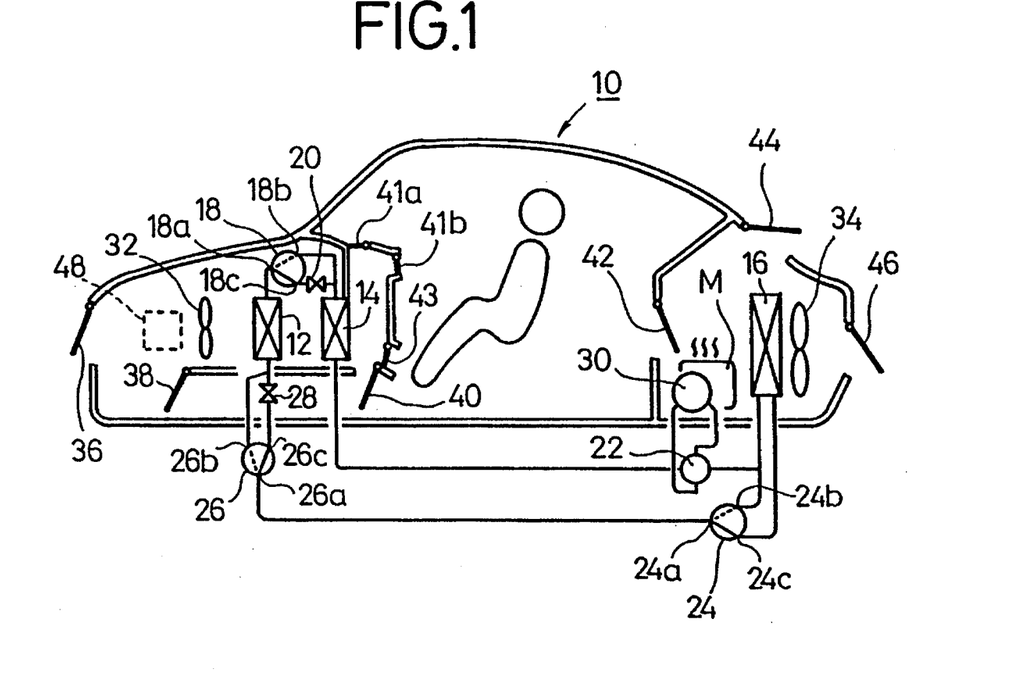
FIG. 1 is a schematic view of a vehicle which incorporates a control apparatus for controlling an air conditioning unit according to the present invention.

As shown in FIG. 1, an electric vehicle 10 has an air conditioning unit which comprises a pair of interior heat exchangers 12, 14 connected in series with each other, an exterior heat exchanger 16, and pipes interconnecting the heat exchangers 12, 14, 16, thereby providing a refrigerant gas circulation system. A bypass valve 18 is connected between the interior heat exchangers 12, 14 and has an inlet port 18a connected to the interior heat exchanger 12 and two outlet ports 18b, 18c, the outlet port 18b being connected directly to the interior heat exchanger 14 and the outlet port 18c being connected through an expansion valve 20 to the interior heat exchanger 14.

A four-way valve 22 is positioned downstream of and connected to the interior heat exchanger 14 and has an outlet port connected to the exterior heat exchanger 16. A bypass valve 24 is positioned downstream of the exterior heat exchanger 16, and has two inlet ports 24b, 24c connected through parallel pipes to the exterior heat exchanger 16 and an outlet port 24a connected to an inlet port 26a of a bypass valve 26. The bypass valve 26 has two outlet ports 26b, 26c connected to respective parallel pipes, one of which is connected through an expansion valve 28 to the interior heat exchanger 12.

The four-way valve 22 is connected through two pipes to a compressor 30. When the four-way valve 22 is switched, it can supply a refrigerant such as a Freon gas to either the exterior heat exchanger 16, the interior heat exchanger 14, or the compressor 30. The interior heat exchangers 12, 14 and the exterior heat exchanger 16 are associated with respective blower fans 32, 34 which can be rotated by respective rotary actuators such as motors (not shown). The air conditioning unit also includes dampers 36, 38, 40, 41a, 41b, 42, 43, 44, 46 for selectively communicating with the atmosphere or effectively convecting air in the passenger's compartment of the electric vehicle.

As will readily appear to those skilled in the art, by operating the compressor 30 to compress and thereby heat the refrigerant which flows through a first heat exchanger to give off heat and be condensed and then through a second heat exchanger to be expanded and absorb heat and by setting the valves and dampers, either warm air or cool air may be selectively supplied to the passenger compartment of vehicle 10.

The electric vehicle also has a battery 48 and an electric motor M.

Now, the electrical arrangement of the control apparatus for controlling the air conditioning unit in the electric vehicle 10 will be described below with reference to FIGS. 2 through 5.

Figure 2:
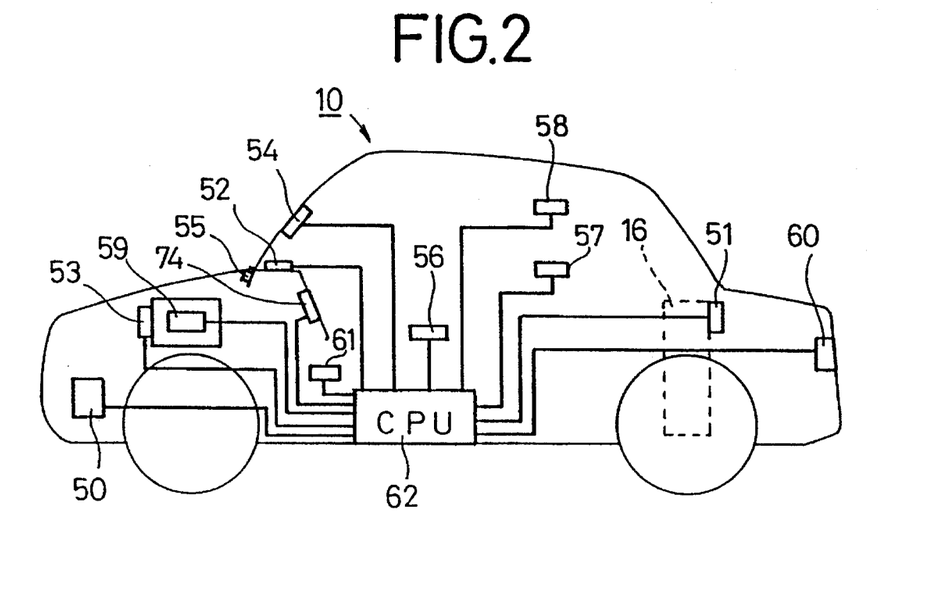
FIG. 2 is a schematic view showing the positions of various sensors on the vehicle shown in FIG. 1.

As shown in FIG. 2, the electric vehicle 10 has an inverter 50 for actuating the compressor 30, an exterior heat exchanger frost sensor 51 associated with the exterior heat exchanger 16, a sunlight sensor 52, a charging/discharging current sensor 53, a humidity sensor 54, a glass frost sensor 55, an interior temperature sensor 56, a door opening/closing sensor 57, a window opening/closing sensor 58, a discharging depth sensor 59, an exterior temperature sensor 60, and a seat pressure sensor 61. The inverter 50 and the sensors have output terminals connected to a central processing unit (CPU) 62.

Figure 3:
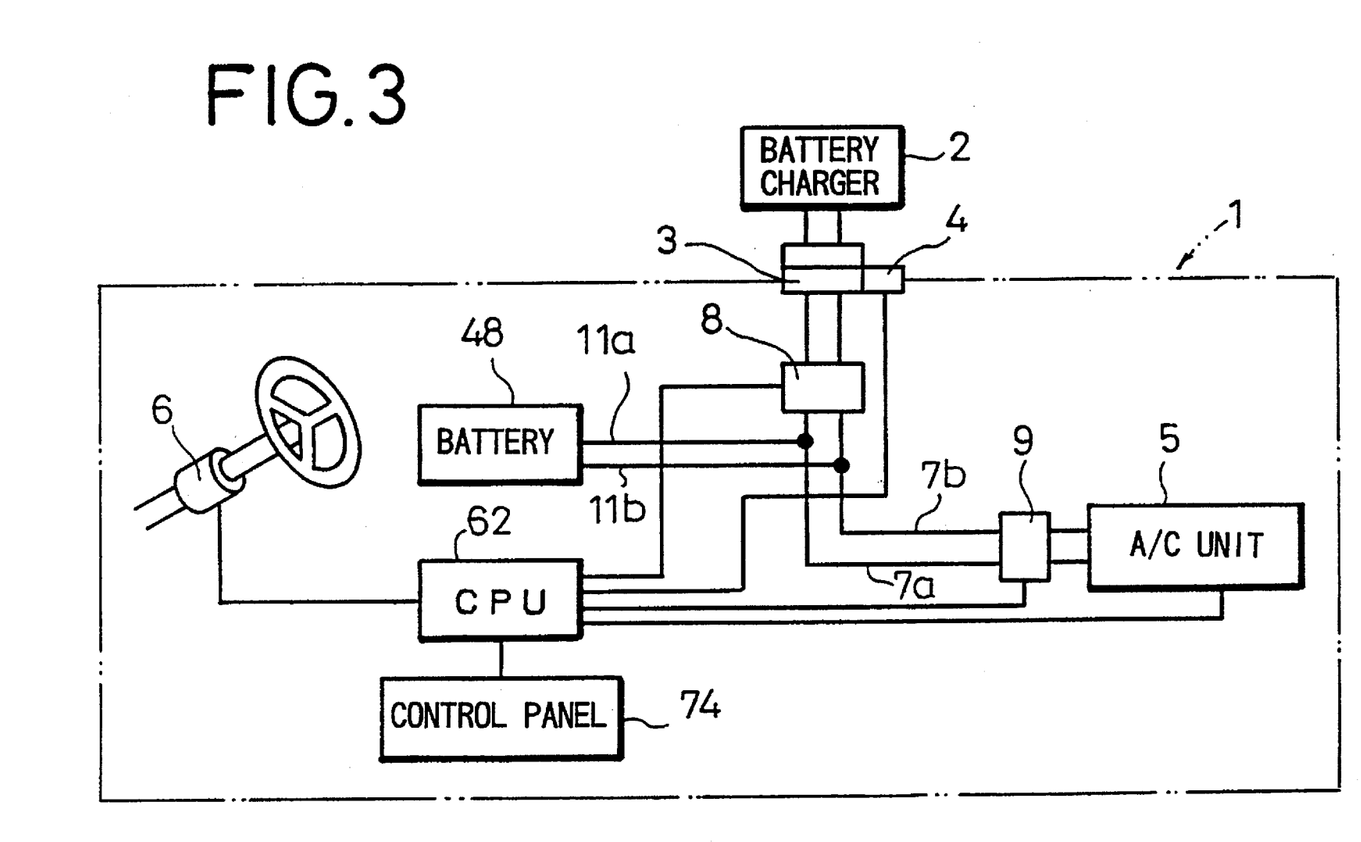
FIG. 3 is a block diagram of the control apparatus.

FIG. 3 shows the control apparatus in block form. As shown in FIG. 3, the control apparatus, generally denoted at 1, includes the battery 48 as an internal power source, a connector 3 to be connected to a battery charger 2 as an external power source, a connection sensor 4 for detecting whether the battery charger 2 is connected to the connector 3 or not, the air conditioning unit, denoted at 5, composed of the interior heat exchangers 12, 14, the exterior heat exchanger 16, etc., a control panel 74 (setting means), an ignition switch 6 (starting detecting means), and the CPU 62 (control means). The connector 3 and the air conditioning unit 5 are electrically connected to each other by wires 7a, 7b through a charger contactor 8 near the battery charger 3 and an air conditioning unit contactor 9 near the air conditioning unit 5. The charger contactor 8 and the air conditioning unit contactor 9 are controlled by the CPU 62. The battery 48 is electrically connected by wires 11a, 11b to the wires 7a, 7b between the charger contactor 8 and the air conditioning unit contactor 9.

Figure 4:
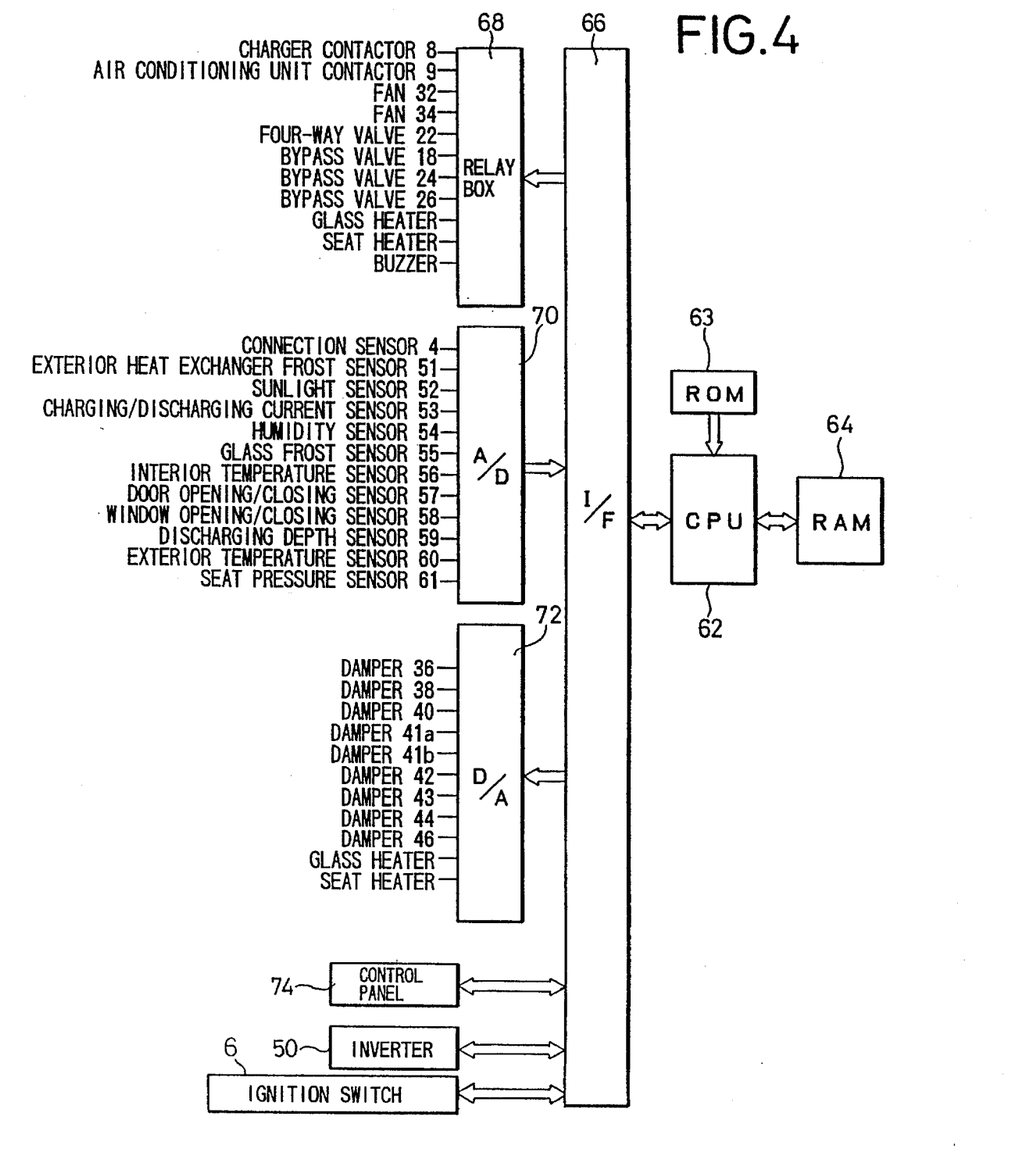
FIG. 4 is a block diagram of a control system of the control apparatus.

FIG. 4 shows in block form a control system of the control apparatus 1.

As shown in FIG. 4, the CPU 62 is connected to a read-only memory (ROM) 63 for storing a control sequence, a random-access memory (RAM) 64 for temporarily storing output signals from the various sensors, and an interface 66.

To the interface 66, there are connected a relay box 68, an analog-to-digital (A/D) converter 70, a digital-to-analog (D/A) converter 72, the control panel 74, the inverter 50, and the ignition switch 6. The relay box 68 serves to turn on and off or switch the charger contactor 8, the air conditioning unit contactor 9, the blower fans 32, 34, the four-way valve 22, the bypass valves 18, 24, 26, a glass heater, a seat heater, and a buzzer. The A/D converter 70 serves to convert analog output signals from the sensors 4, 51 through 61 into digital signals, and the D/A converter 71 serves to convert digital control signals into analog control signals to be supplied to the dampers 36 through 46, the glass heater, and the seat heater.

Figure 5:
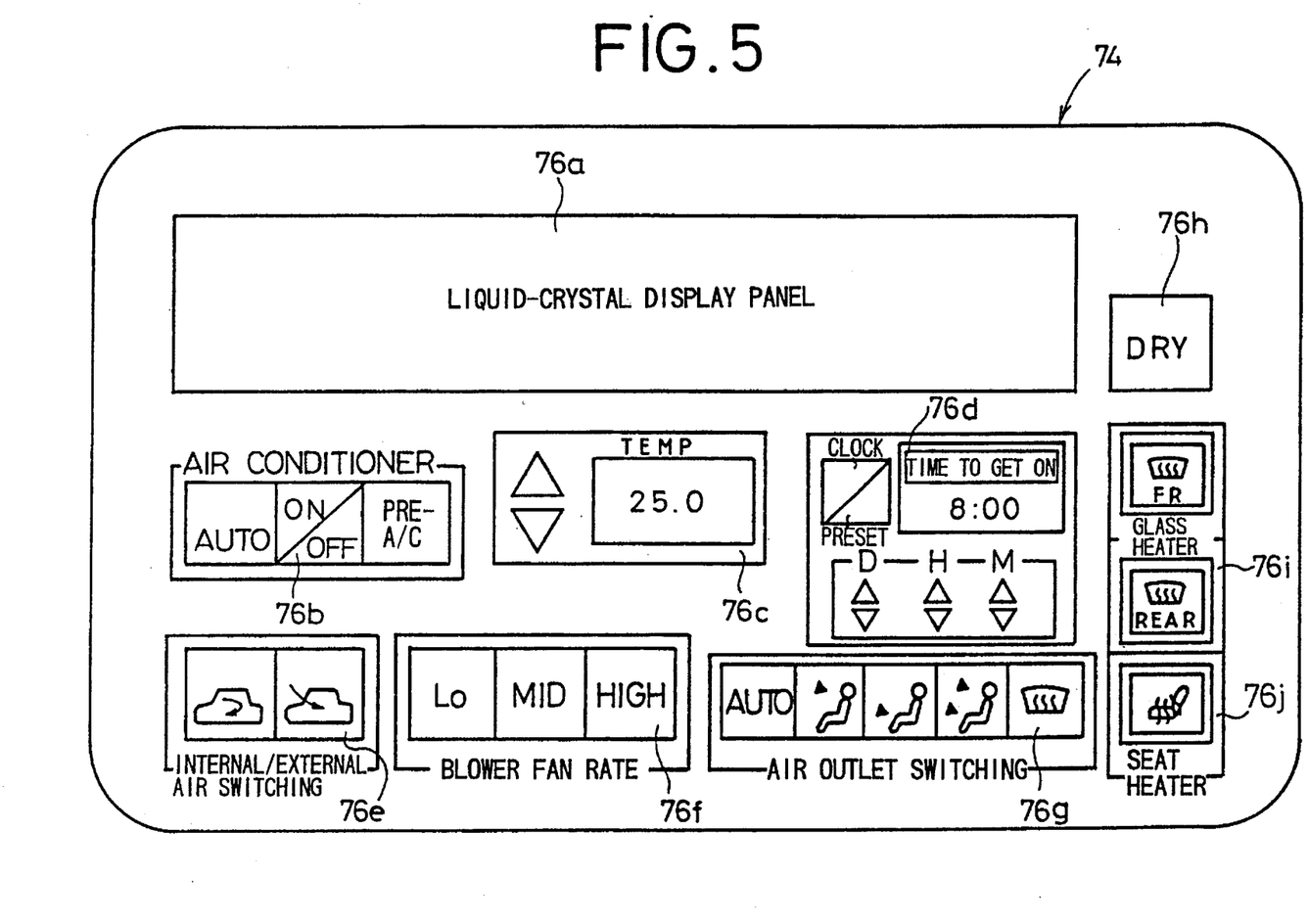
FIG. 5 is a view of a control panel in the vehicle shown in FIG. 1.

As shown in FIG. 5, the control panel 74 is divided into nine blocks. Specifically, the control panel 74 includes a liquid-crystal display panel 76a in its uppermost block for displaying temperature, humidity, and other data from various sensors in digital or analog form.

The control panel 74 also includes an air conditioning unit switch block 76b for switching the air conditioning unit into and out of operation. The air conditioning unit switch block 76b has an AUTO switch for automatically regulating the temperature or humidity in the passenger's compartment, an ON/OFF switch for manually switching the air conditioning unit into and out of operation, and a PRE-A/C switch for carrying out a pre-air conditioning mode to regulate the temperature or humidity in the passenger's compartment with the external power source before the driver or passengers get into the electric vehicle.

A temperature setting switch block 76c has a display area for displaying a set or detected temperature in digital form, a triangular UP switch for incrementing the set temperature, and a triangular DOWN switch for decrementing the set temperature.

A digital display block 76d includes a display area for digitally displaying a clock or a preset time for the driver or passengers to get into the electric vehicle, a switch for setting the clock or the preset time, and UP/DOWN switches for incrementing and decrementing a date (D), an hour (H), and a minute (M). By setting a date (D), an hour (H), and a minute (M) with the UP/DOWN switches, the time for the driver or passengers to get into the electric vehicle is changed or fixed.

An interior/exterior air switch block 76e has a right-hand switch for introducing external air into the passenger's compartment, and a left-hand switch for circulating air in the passenger's compartment. Each of these switches comprises an ON/OFF switch.

A blower fan air rate switch block 76f includes a Lo switch for convecting or introducing air at a relatively low rate, a MID switch for convecting or introducing air at a medium rate, and a HIGH switch for convecting or introducing air at a high rate.

An air outlet switch block 76g serves to open and close the various dampers shown in FIG. 1 to control air flows through air outlets into the passenger's compartment. Specifically, the air outlet switch block 76g has an AUTO switch for automatically switching air outlets, a second switch from the left for sending air toward the chest of the driver, a third switch for sending air toward the legs of the driver, a fourth switch for sending air toward the chest and legs of the driver, and a right-hand switch for sending air along the inner surface of a front windshield of the electric vehicle.

The control panel 74 also includes a switch 76h for setting a dry mode while the electric vehicle is running normally, and heat mode ON/OFF switches 76i, 76j for turning on and off heaters for heating front and rear windshields and a seat.

A process of controlling the air conditioning unit 5 in the electric vehicle 10 will be described below.

Figure 6:
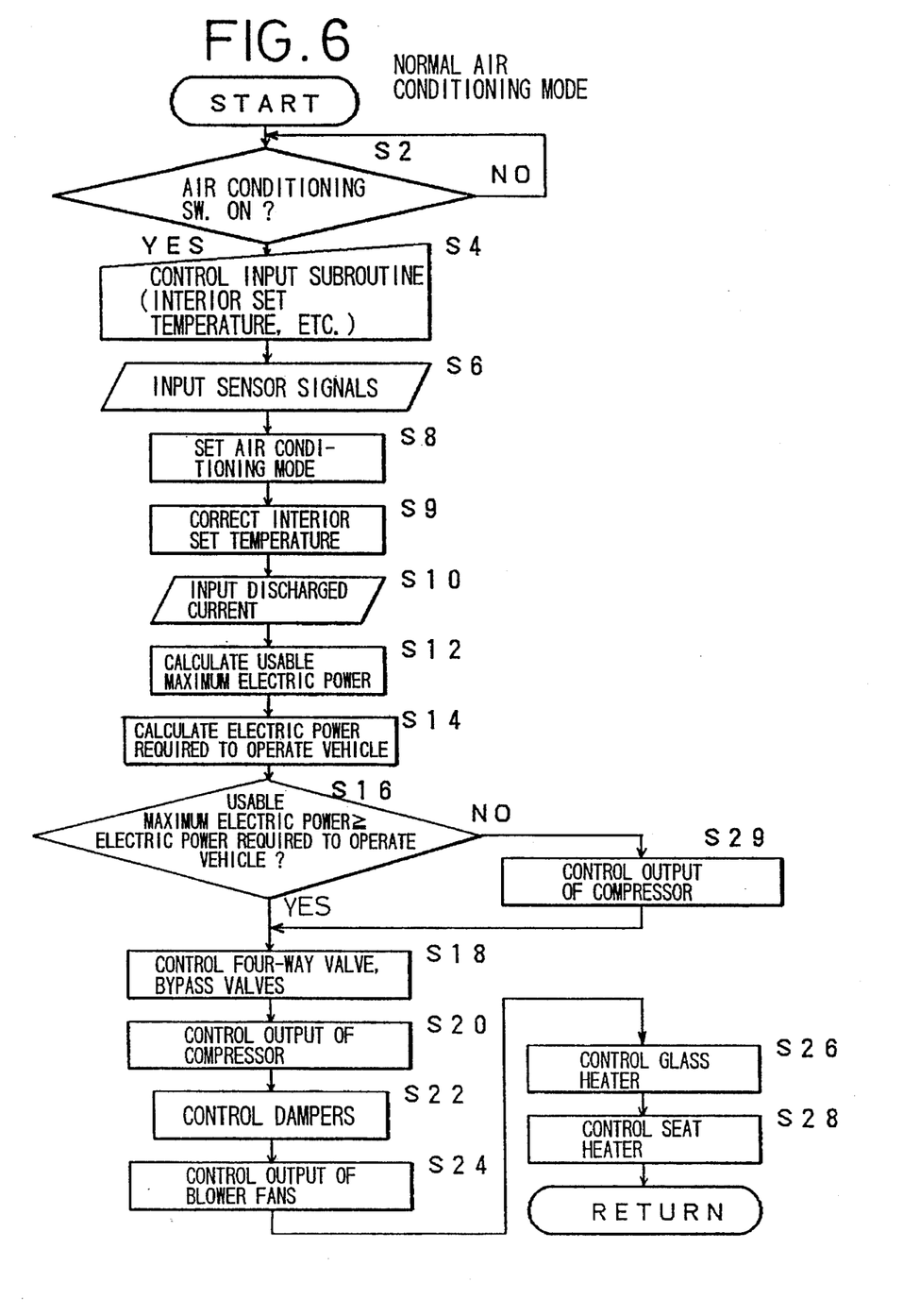
FIG. 6 is a flowchart of an operation sequence of a normal air conditioning mode of the air conditioning unit.

FIG. 6 shows an operation sequence of a normal air conditioning mode of the air conditioning unit 5 while the electric vehicle 10 is running.

When the AUTO switch of the air conditioning unit switch block 76b (see FIG. 5) is turned on in a step S2 and an interior temperature for the passenger's compartment is set by the temperature setting switch block 76c in a step S4, the CPU 62 reads information from the various sensors in a step S6, and establishes a cooling or heating air conditioning mode based on the read information from the sensors in a step S8. The interior set temperature is corrected in a step S9 depending on the conditions sensed by the sensors.

Then, the CPU 62 reads a discharged current of the battery 48 from the charging/discharging current sensor 53 in a step S10, and calculates a remaining storage capacity of the battery 48 from the discharged current and a maximum electric power that can be used at the remaining storage capacity in a step S12. The CPU 62 also calculates a total electric power required to operate the electric vehicle 10 in a step S14. The total electric power is composed of the electric power to energize the electric motor M, the electric power to energize various electric components such as head lamps other than the electric motor M, and the electric power to energize the air conditioning unit 5. The CPU 62 then determines whether or not the usable maximum electric power calculated in the step S12 is equal to or greater than the total electric power required to operate the electric vehicle 10 in a step S16. If the usable maximum electric power is equal to or greater than the total electric power required to operate the electric vehicle 10, i.e. "YES" in step S16, then the CPU 62 controls the four-way valve 22 and the bypass valves 18, 24, 26, etc. in a step S18.

In the step S16, the CPU 62 determines whether the remaining storage capacity of the battery 48 is large enough to supply the electric power required to propel the electric vehicle 10 and use the air conditioning unit 5. If the remaining storage capacity of the battery 48 is large enough, then after having executed the step S18, the CPU 62 controls the output of the compressor 30 in a step S20, controls the opening and closing of the dampers 36 through 46 in a step S22, controls the output of the blower fans 32, 34 in a step S24, controls the glass heater in a step S26, and controls the seat heater in a step S28.

If it is determined in step S16 that the usable maximum electric power is lower than the total electric power required to operate the electric vehicle 10, i.e. "NO" then the CPU 62 limits the output of the compressor 30 until the usable maximum electric power becomes equal to or greater than the total electric power required to operate the electric vehicle 10 in a step S29.

Figure 7:
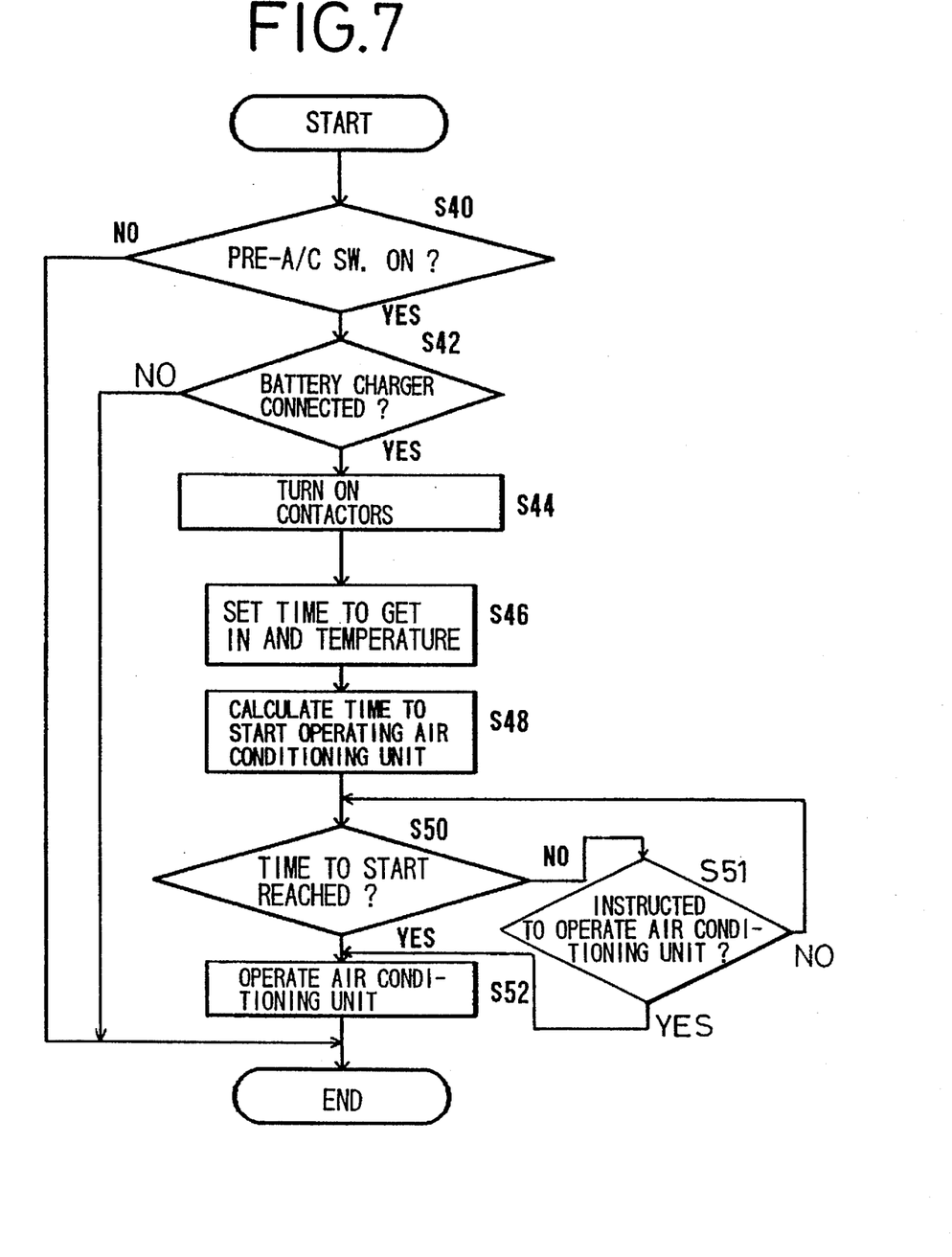
FIG. 7 is a flowchart of an operation sequence of a pre-air conditioning mode of the air conditioning unit.

A pre-air conditioning mode for air-conditioning the passenger's compartment before the electric vehicle 10 runs will be described below with reference to FIGS. 3 and 7.

The pre-air conditioning mode is usually carried on while the battery 48 is being charged at night or when the electric vehicle is parked, so that the temperature, humidity, etc. in the passenger's compartment will be regulated before the driver gets into the electric vehicle 10, for attaining a comfortable riding environment in the passenger's compartment at the time the driver gets into the electric vehicle 10.

When the PRE-A/C switch of the air conditioning unit switch block 76b is turned on in a step S40 and the battery charger 2 is connected to the connector 3 in a step S42, the connection of the battery charger 2 is detected by the connection sensor 4, which applies a detected signal to the CPU 62. Based on the detected signal, the CPU 62 turns on the charger contactor 8 and the air conditioning unit contactor 9 in a step S44, thereby connecting the connector 3 to the battery 48 and the air conditioning unit 5 through the wires 7a, 7b and 11a, 11b. As a result, the battery 48 starts being charged by the battery charger 2.

The CPU 62 reads a time at which the driver will get into the electric vehicle 10 next time and a preset interior temperature for the time the driver will get into the electric vehicle 10, from the RAM 64, and displays the time and the preset temperature on the liquid-crystal display panel 76a of the control panel 74. The driver operates switches in the temperature setting switch block 76c and the digital display block 76d to reset, if necessary, the time at which the driver will get into the electric vehicle 10 and the interior temperature for the time the driver will get into the electric vehicle 10, in a step S46. The set data is stored as new data in the RAM 64.

Then, the CPU 62 calculates a time to start the pre-air conditioning mode from the time that has been set in the step S46, and stores the calculated time in a step S48. Thereafter, the CPU 62 compares the present time with the calculated time to start the pre-air conditioning mode in a step S50. If the compared times coincide with each other, then the CPU 62 outputs a command to operate the air conditioning unit 5 in a step S52. If the CPU 62 receives an air conditioning unit operation command from an external remote controller such as a card-type key or the like in a step S51, then the CPU 62 outputs a command to operate the air conditioning unit 5 in the step S52 regardless of whether the time to start the pre-air conditioning mode has been reached or not. The air conditioning unit 5 now starts to operate in the pre-air conditioning mode based on the electric power supplied from the battery charger 2.

The control apparatus 1 carries out operation sequences of the air conditioning unit 5 before and after the pre-air conditioning mode. Such operation sequences will be described below with reference to FIGS. 8 and 9A, 9B.

Figure 8:
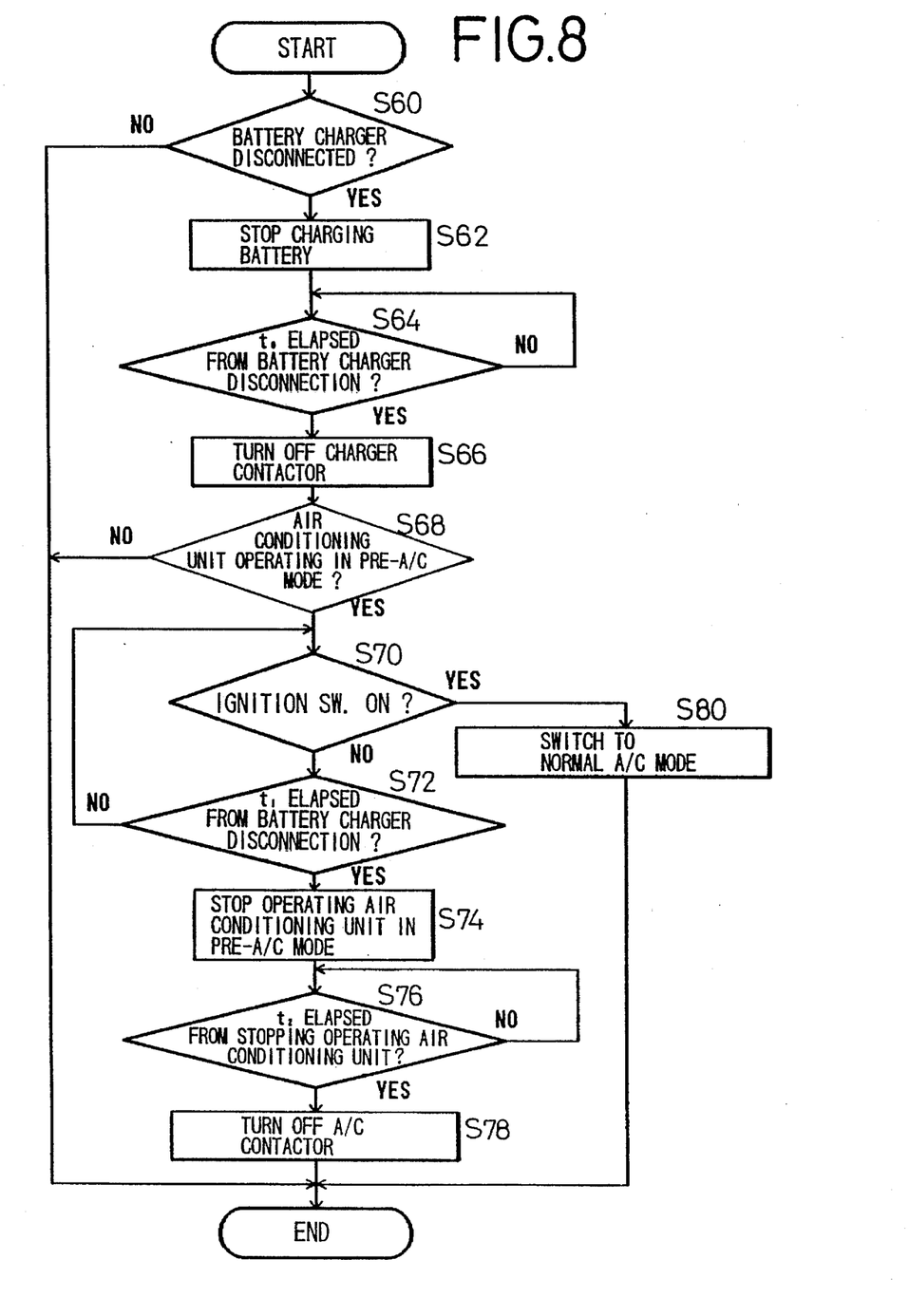
FIG. 8 is a flowchart of operation sequences of the air conditioning unit before and after the pre-air conditioning mode.
Figure 9A:
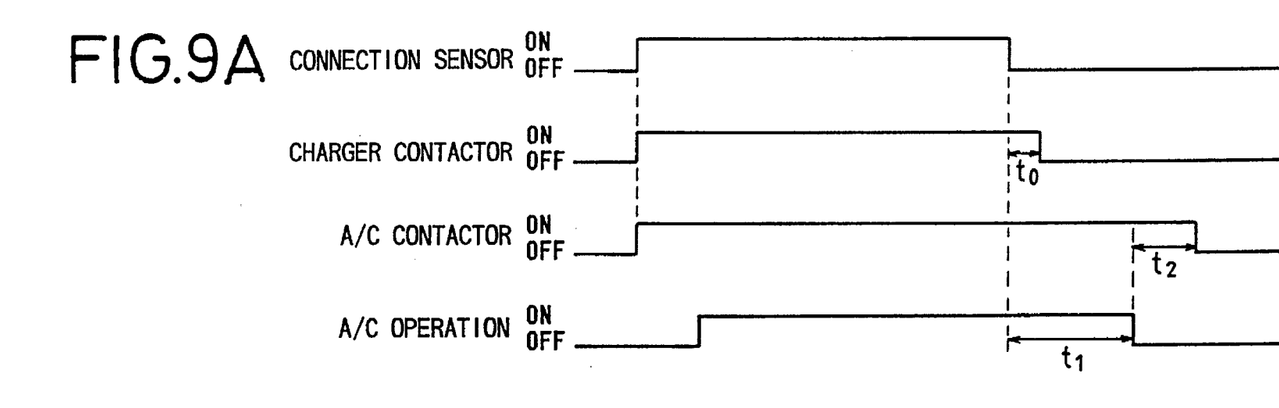
FIGS. 9A and 9B are timing charts of signals in the control apparatus in the operation sequences shown in FIG. 8.
Figure 9B:
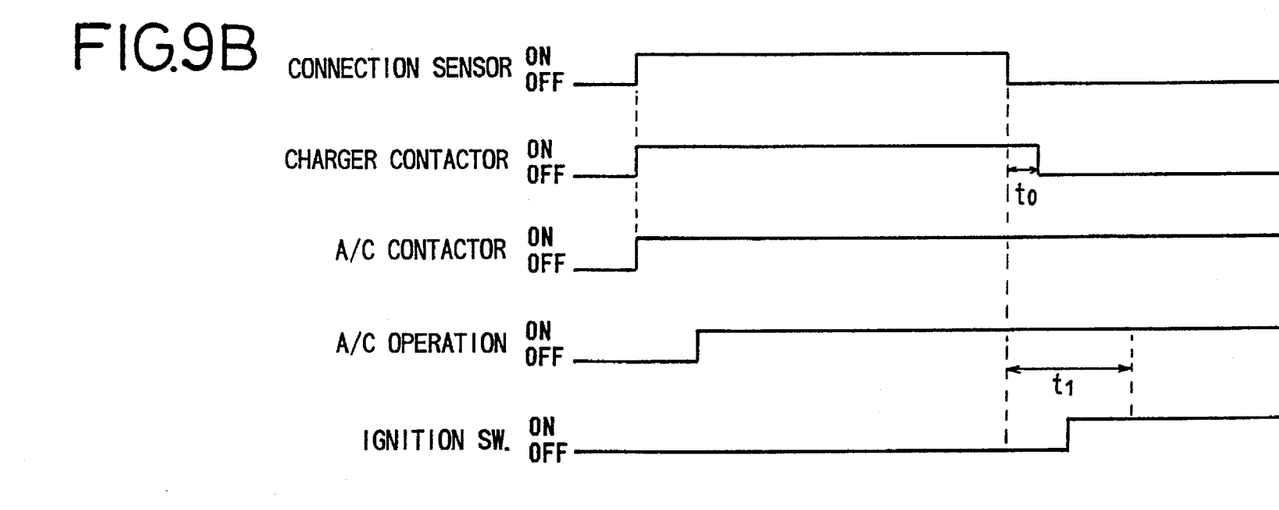

The CPU 62 always monitors the connection of the battery charger 2 based on the signal from the connection sensor 4. When the battery charger 2 is disconnected from the connector 3 by the driver or accidentally dislodged, the connector sensor 4 detects the battery charger 2 as disconnected, and transmits a detected signal to the CPU 62 in a step S60. Based on the detected signal, the CPU 62 stops charging the battery 48 in a step S62. The air conditioning unit 5 continues to operate in the pre-air conditioning mode with the electric energy charged in the battery 48. Then, upon elapse of a predetermined time $t_0$ after the reception of the detected signal in a step S64, the CPU 62 turns off the charger contactor 8, disconnecting the battery 48 from the battery charger connection from outside of the electric vehicle 10 in a step S66.

The CPU 62 determines whether the air conditioning unit 5 is operating in the pre-air conditioning mode or not in a step S68. If the air conditioning unit 5 is operating in the pre-air conditioning mode, then the CPU 62 determines whether there is a start signal from the ignition switch 6 or not in a step S70.

If there is no start signal from the ignition switch 6, i.e., if the battery charger 2 is disconnected by the driver or accidentally dislodged while the air conditioning unit 5 is operating in the pre-air conditioning mode and also if the driver does not immediately move the electric vehicle 10, then the control apparatus 1 operates as follows:

The CPU 62 measures time after having detected the disconnection of the battery charger 2 with the connection sensor 4. If the measured time exceeds a predetermined time $t_1$ (see FIG. 9A) in a step S72, the CPU 62 stops operating the air conditioning unit 5 in a step S74. Upon elapse of a predetermined time $t_2$ after having stopped operating the air conditioning unit 5, as determined in a step S76, the CPU 62 turns off the air conditioning unit contactor 9 in a step S78, thus disconnecting the battery 48 from the air conditioning unit 5.

According to the above operation sequence, even when the driver does not start the electric vehicle 10 at a preset time or the battery charger 2 is disconnected or dislodged while in the pre-air conditioning mode, the electric energy stored in the battery 48 is not wasted, and hence subsequent running operation of the electric vehicle 10 will not be hampered.

If a start signal is inputted from the ignition switch 6 during the pre-air conditioning mode, then the control apparatus 1 operates as follows:

The CPU 62 measures time after having detected the disconnection of the battery charger 2 with the connection sensor 4. If a start signal is inputted from the ignition switch 6, as detected in step S70, before the predetermined time $t_1$ expires in a step S72, the CPU 62 switches from the pre-air conditioning mode to the normal air conditioning mode in a step S80. Specifically, the CPU 62 holds the air conditioning unit contactor 9 turned on thereby to continue operating the air conditioning unit 5.

According to the above operation sequence, when the driver starts to run the electric vehicle 10, the air conditioning unit 5 automatically switches from the pre-air conditioning mode to the normal air conditioning mode. Since the driver is not required to reset the air conditioning unit 5, the driver finds it easy or less cumbersome to operate the air conditioning unit 5.

Although a certain preferred embodiment of the present invention has been shown and described in detail, it should be understood that various changes and modifications may be made therein without departing from the scope of the appended claims.

What is claimed is:

1. A control apparatus for controlling an air conditioning unit in a motor vehicle, comprising:

an internal power source mounted on the motor vehicle for supplying energy to the motor vehicle;

a connector for connection to an external power source for supplying energy to the motor vehicle;

connection detecting means for detecting a connection of the external power source to said connector;

an air conditioning unit energizable by the energy supplied from the internal power source or the external power source for regulating a riding environment including a temperature in a passenger's compartment of the motor vehicle;

setting means for setting a time to start operating said air conditioning unit; and control means for starting operation of said air conditioning unit either when the time set by said setting means to start operating the air conditioning unit is reached or when instructed to start operating the air conditioning unit, and thereafter for stopping operation of said air conditioning unit when a time which has elapsed after said connection detecting means has detected a disconnection of the external power source from said connector reaches a predetermined time, said control means causing said air conditioning unit to be powered by said internal power source for said predetermined time after said disconnection of the external power source has been detected.

2. A control apparatus according to claim 1, further comprising:

starting detecting means for detecting a starting of the motor vehicle; and said control means including means for continuing operation of said air conditioning unit beyond said predetermined time when said starting detecting means detects a starting of the motor vehicle within said predetermined time.

3. A control apparatus according to claim 1, further comprising:

a contactor for electrically connecting and disconnecting said air conditioning unit from said internal power source;

said control means including means for actuating said contactor to disconnected said air conditioning unit from said internal power source when a second predetermined time has elapsed after said stopping operation of said air conditioning unit.

4. A control apparatus for controlling an air conditioning unit in a motor vehicle operable by an external power source, comprising:

detecting means for detecting that the external power source is being supplied to the air conditioning unit;

setting means for setting a start time to start operating said air conditioning unit while being powered by the external power source;

means for enabling operation of said air conditioning unit to be powered by an internal power source mounted on said vehicle; and control means responsive to said setting means for starting operation of said air conditioning unit and responsive to said detecting means for stopping operation of said air conditioning unit when said detecting means detects an absence of supply of the external power-source for a predetermined time, said control means causing said air conditioning unit to be powered by said internal power source mounted on said vehicle; and control means responsive to said setting means for starting operation of said air conditioning unit and responsive to said detecting means for stopping operation of said air conditioning unit when said detecting means detects an absence of supply of the external power-source for a predetermined time, said control means causing said air conditioning unit to be powered by said internal power source for said predetermined time after said disconnection of the external power source has been detected.

5. A control apparatus according to claim 4, further comprising:

starting detecting means for detecting a starting of the motor vehicle; and said control means including means for continuing operation of said air conditioning unit beyond said predetermined time when said starting detecting means detects a starting of the motor vehicle within said predetermined time.

6. A control apparatus according to claim 4, further comprising:

a contactor for electrically connecting and disconnecting said air conditioning unit from said internal power source;

said control means including means for actuating said contactor to disconnected said air conditioning unit from said internal power source when a second predetermined time has elapsed after said stopping operation of said air conditioning unit.

\* \* \* \* \*